(12) United States Patent
Droesbeke et al.

(10) Patent No.: US 9,755,358 B2
(45) Date of Patent: Sep. 5, 2017

(54) CONNECTOR ASSEMBLY

(71) Applicant: FCI Asia Pte. Ltd., Singapore (SG)

(72) Inventors: Gert Droesbeke, Chartres (FR); Aymeric Soudy, Besancon (FR)

(73) Assignee: FCI Asia Pte. Ltd., KA Place (SG)

( * ) Notice: Subject to any disclaimer, the term of this patent is extended or adjusted under 35 U.S.C. 154(b) by 0 days.

(21) Appl. No.: 14/895,945

(22) PCT Filed: Jun. 7, 2013

(86) PCT No.: PCT/IB2013/001335
§ 371 (c)(1),
(2) Date: Dec. 4, 2015

(87) PCT Pub. No.: WO2014/195748
PCT Pub. Date: Dec. 11, 2014

(65) Prior Publication Data
US 2016/0126667 A1    May 5, 2016

(51) Int. Cl.
*G02B 6/38* (2006.01)
*H01R 13/627* (2006.01)
*H01R 12/70* (2011.01)
*H01R 13/629* (2006.01)
*H01R 13/639* (2006.01)
*H01R 12/71* (2011.01)

(52) U.S. Cl.
CPC ....... *H01R 13/6271* (2013.01); *G02B 6/3893* (2013.01); *H01R 12/7005* (2013.01); *H01R 13/62938* (2013.01); *H01R 13/639* (2013.01); *H01R 12/716* (2013.01); *H01R 2201/26* (2013.01)

(58) Field of Classification Search
CPC .... G02B 6/3897; G02B 6/4455; G02B 6/445; H01R 13/627; H01R 13/6273; H01R 13/639; H01R 13/518
USPC .............................. 385/53–56; 439/345, 157
See application file for complete search history.

(56) References Cited

U.S. PATENT DOCUMENTS

| 5,344,194 A | * | 9/1994 | Hatagishi | ......... H01R 13/62933 |
| | | | | 285/26 |
| 5,575,671 A | * | 11/1996 | Katsuma | .......... H01R 13/62955 |
| | | | | 439/157 |
| 6,558,176 B1 | * | 5/2003 | Martin | ............. H01R 13/62944 |
| | | | | 439/157 |

(Continued)

FOREIGN PATENT DOCUMENTS

| JP | 2003-22872 | 1/2003 |
| JP | 2003-68397 A | 3/2003 |

(Continued)

OTHER PUBLICATIONS

European Office Action for European Application No. 13742267.1 dated Oct. 20, 2016.

*Primary Examiner* — Ellen Kim
(74) *Attorney, Agent, or Firm* — Wolf, Greenfield & Sacks, P.C.

(57) ABSTRACT

A connector assembly including a first connector, a second connector and a latch for connecting the first and second connectors. A securing lock is rotatable between a release position and a securing position securing the latch in a latching position. Optionally, the assembly includes a sliding guide and a resilient element forcing the securing lock to slide via the sliding guide into the securing position.

20 Claims, 12 Drawing Sheets

(56) References Cited

U.S. PATENT DOCUMENTS

Figure 1A:
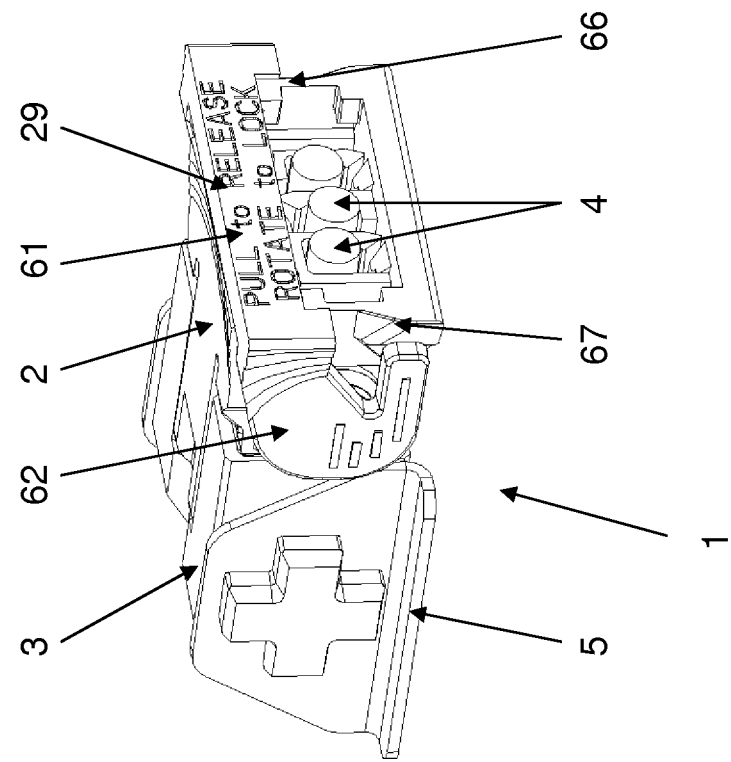

| | | | |
|---|---|---|---|
| 7,442,058 B2 | 10/2008 | Ohtaka et al. | 439/157 |
| 2003/0054681 A1 | 3/2003 | Hatagishi et al. | 439/157 |
| 2003/0199185 A1* | 10/2003 | Fujii | H01R 13/506 |
| | | | 439/157 |
| 2011/0053405 A1* | 3/2011 | Kobayashi | H01R 13/62955 |
| | | | 439/345 |
| 2011/0117761 A1 | 5/2011 | Loncar et al. | |
| 2011/0151694 A1* | 6/2011 | Horiuchi | H01R 13/62938 |
| | | | 439/157 |
| 2013/0017697 A1 | 1/2013 | Furuya et al. | |
| 2015/0263453 A1* | 9/2015 | Wang | H01R 13/6335 |
| | | | 385/76 |

FOREIGN PATENT DOCUMENTS

| | | |
|---|---|---|
| JP | 2005-302581 | 10/2005 |
| WO | WO 2011/087863 A2 | 7/2011 |

* cited by examiner

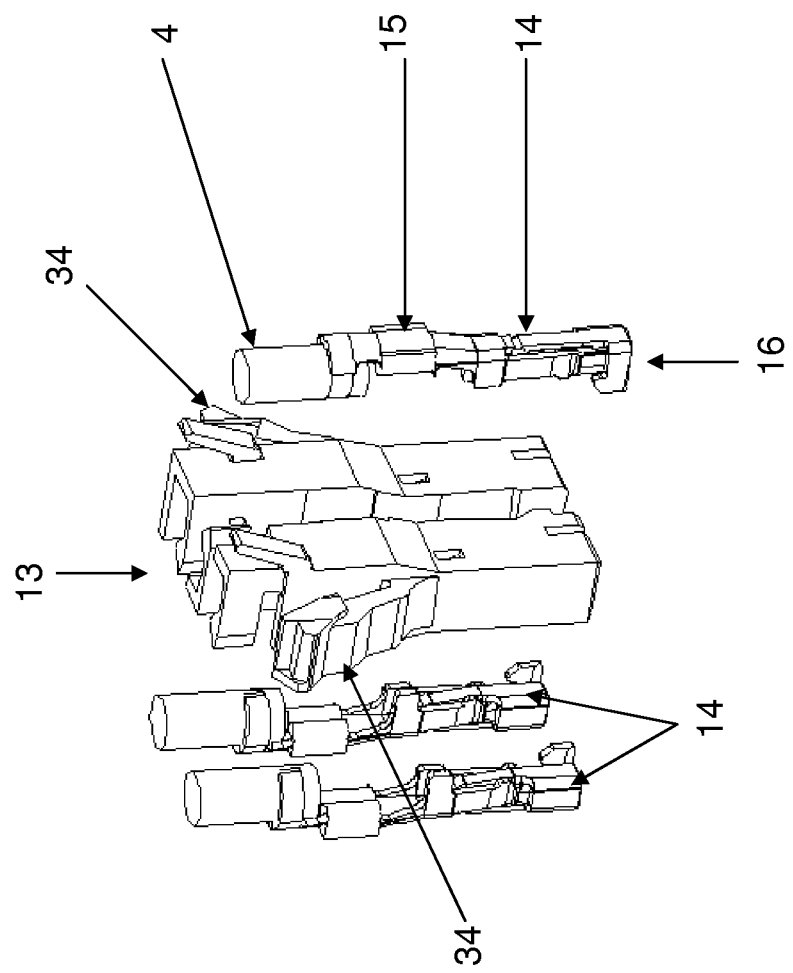

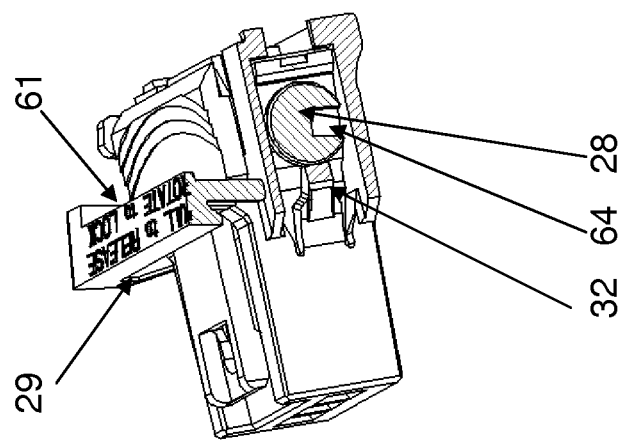
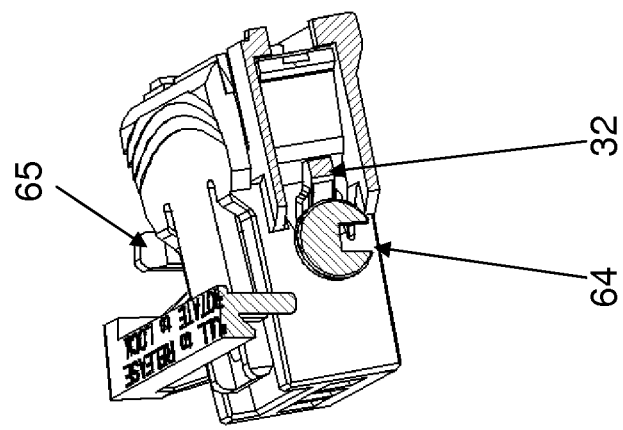
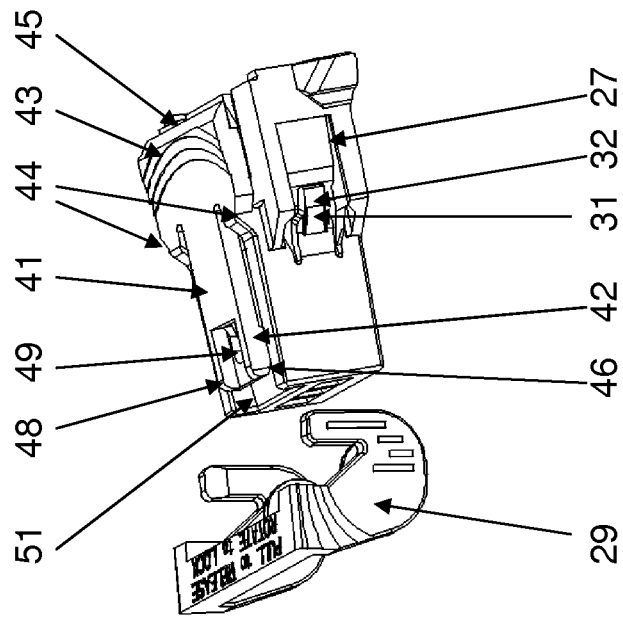

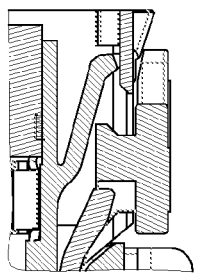
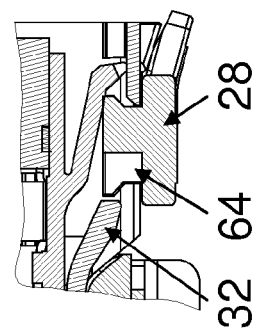
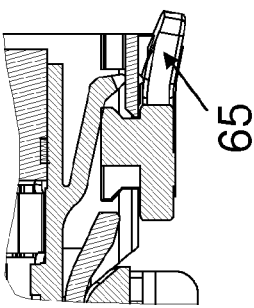
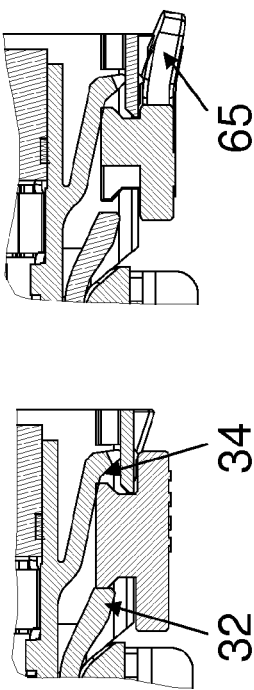
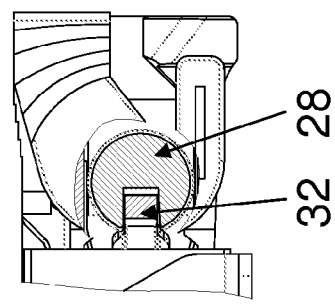
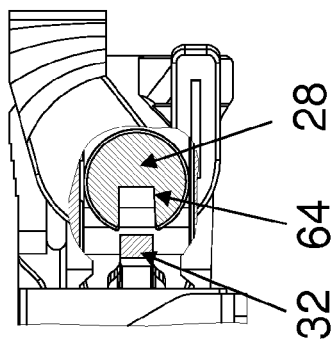
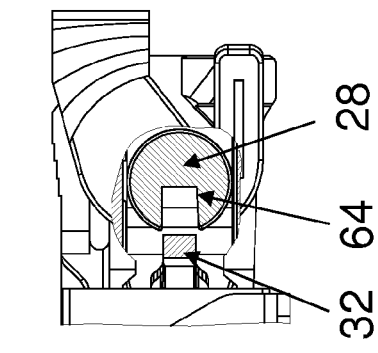
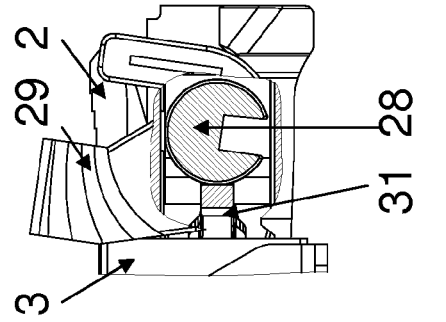

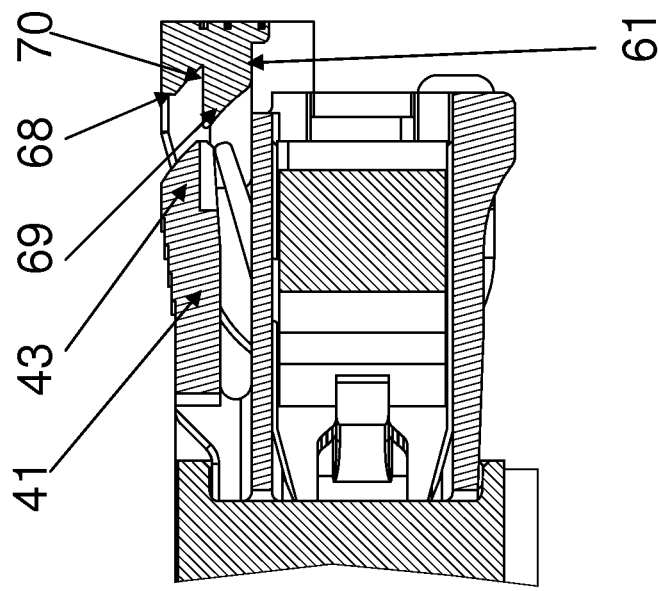
Fig. 11A                    Fig. 11B

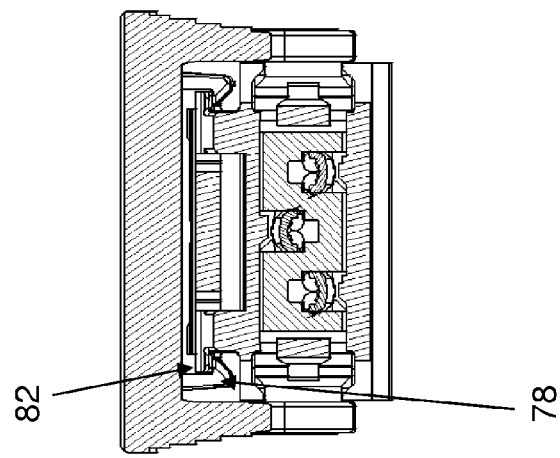
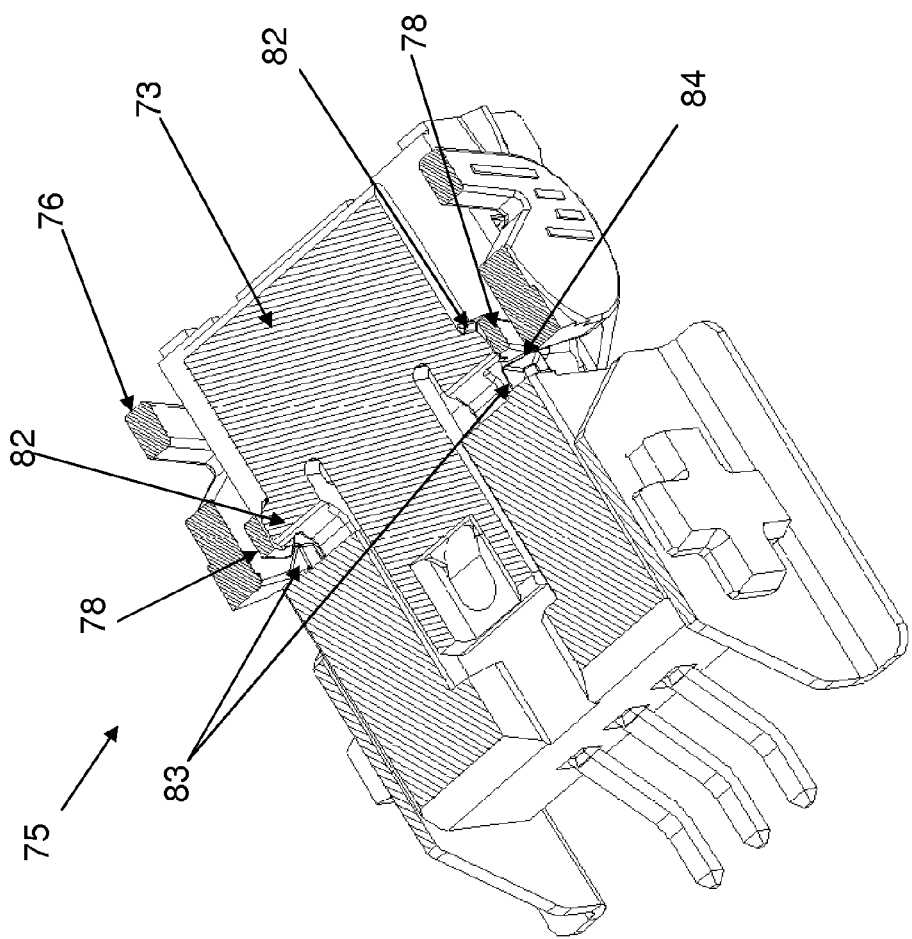

CONNECTOR ASSEMBLY

The invention relates to a connector assembly of two complementary connectors locked together by a latch mechanism. Such an assembly can for instance comprise a cable connector and an on-board pin header connector on a printed circuit board or a similar substrate. The connectors can for example be electrical connectors or optical connectors.

Particularly with connectors in the automotive field, connections between the connectors should be durable and reliable. Unintentional disengagement, e.g., by vibrational loads, should be prevented. To that end secondary locks are used, generally referred to as a connection position assurance (CPA) device. The use of such a CPA makes it more complicated to prepare the connector assembly for use. Accordingly, there is a need to provide a connector assembly with a reliably securable locking mechanism, which is easier to assemble and use.

To this end, a connector assembly is disclosed comprising a first connector, a second connector and a latch for connecting the first and second connectors. The assembly comprises a securing lock, which is rotatable between a release position and a securing position securing the latch in a latching position. The securing lock effectively forms a rotatable CPA. The rotatable movement of the securing lock is essentially different form the movement required for coupling the two connectors. Consequently a user can easier distinguish the two steps and carry them out step by step, which reduces the risk of making mistakes.

Optionally, the securing lock is rotatable between a release position and an intermediate position, the assembly comprising a sliding guide and a resilient element forcing the securing lock to slide via the sliding guide into the securing position.

The securing lock may for example comprise one or more cylindrical parts defining a rotational axis, wherein the sliding guide comprises a recess in the cylindrical part and a protrusion slideable within the recess when the securing lock is between the intermediate position and the securing position.

The resilient element, which forces the securing lock to slide via the sliding guide, can for example comprise at least one flexible arm of the securing lock. The flexible arm can be spring loaded by a slanting surface during movement of the securing lock into its intermediate position.

Optionally, the latch can be pivotable about a pivot section or axis, the latch having a latch end at one side of the pivot section and a release end at the opposite side of the pivot section. The securing lock can, e.g., engage the release end when the securing lock is in its securing position to prevent pivoting of the latch when the latch is in its latching position. In a more specific embodiment, the securing lock comprises an edge sliding below a lower surface of the release end of the latch when the securing lock moves into its securing position. This way, the release end can be immobilized disabling unintentional unlatching.

In an alternative embodiment, the securing lock can be configured to cover the release end of the latch instead of immobilizing it. As a result the release end is not accessible anymore and cannot be pushed down anymore.

It may be desirable to prevent rotation of the securing lock as long as the connectors of the assembly are not yet fully mated. To this end, the assembly can for instance be provided with one or more stops blocking the securing lock in its release position, and one or more release elements to release the securing lock when the connectors are fully mated to enable rotation of the securing lock into its securing position.

Such stops may for example include one or more hooks of the securing lock. The securing lock can be attached to one of the connectors of the assembly, the connector being provided with one or more cams engaging the hooks to keep the securing lock into its release position. The other connector of the assembly can for example comprise one or more protrusions, each protrusion being configured to force a hook and an associated cam apart to unhook the hook from the cam, when mating of the two connectors is completed.

The hooks and the cams can for instance have mutually engaging contact faces under a right angle with a pulling direction of a pulling force needed to pull the hooks and cams apart. As a result, the hooks and the cams cannot be pulled apart from each other. Optionally, the hooks and the cams can have chamfered or rounded faces engaging each other when the protrusions of the other connector are about half way in flexing the hooks to unhook them from the cams. This would decrease the angle between the pulling direction and the respective contact faces during unhooking by the protrusions. This would allow release of the hooks merely by pulling the hooks from the respective cams. The hooks can for example be integral part of arms of securing lock or they can be protrusions of the securing lock at a distance from the securing lock arms.

Optionally, the securing lock and one of the connectors of the assembly can be provided with mutually engaging snap sections to lock the securing lock in its securing position.

In a specific embodiment, the securing lock may comprise two arms and a handle bar bridging outer ends of the two arms, while opposite outer ends of the arms rotationally engage side faces of one of the connectors of the assembly.

In a further aspect a connector is disclosed configured as a first connector or as a second connector in a connector assembly as disclosed above. Furthermore, a housing is disclosed for a connector configured as a first connector or as a second connector in an assembly as disclosed above.

The disclosed connectors are particularly useful for use in the automotive field, e.g., for connecting LED lamps to a PCB controlling and/or powering the LED lamps.

The invention will be further explained under reference to the accompanying drawings.

Figure 1B:
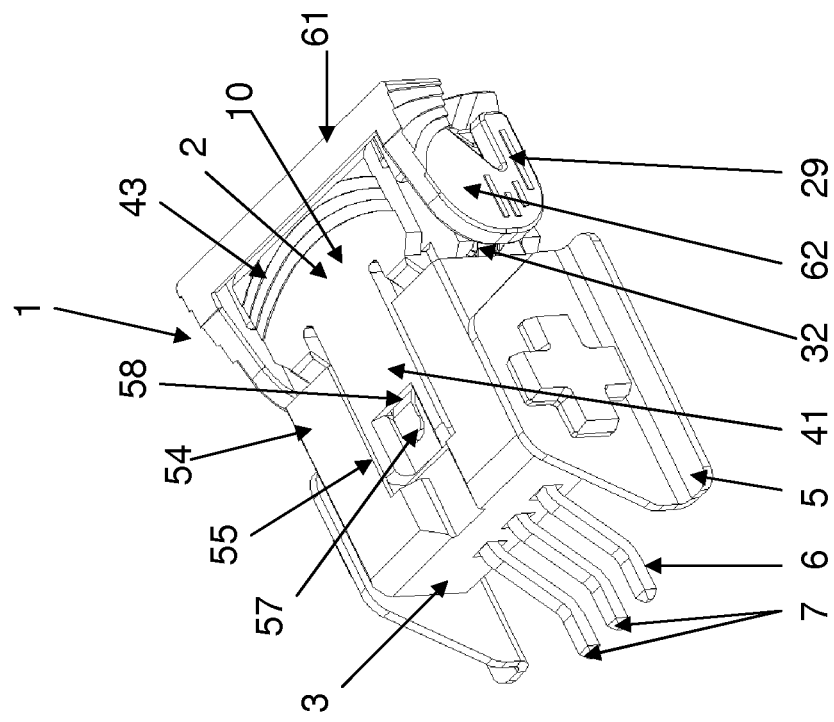
Figure 3:
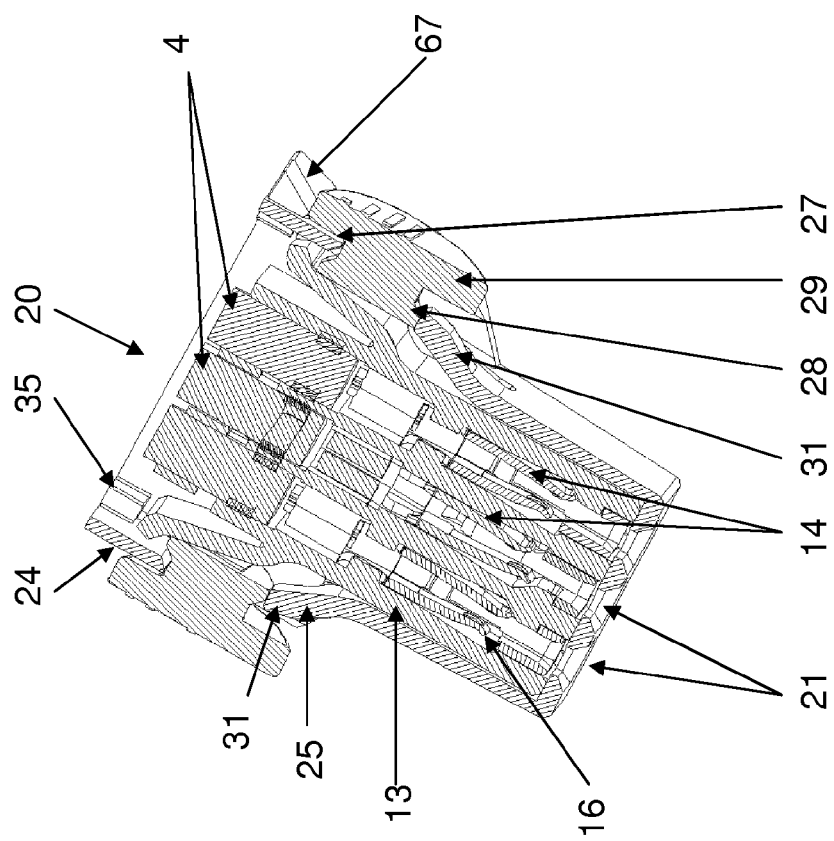
Figure 2:
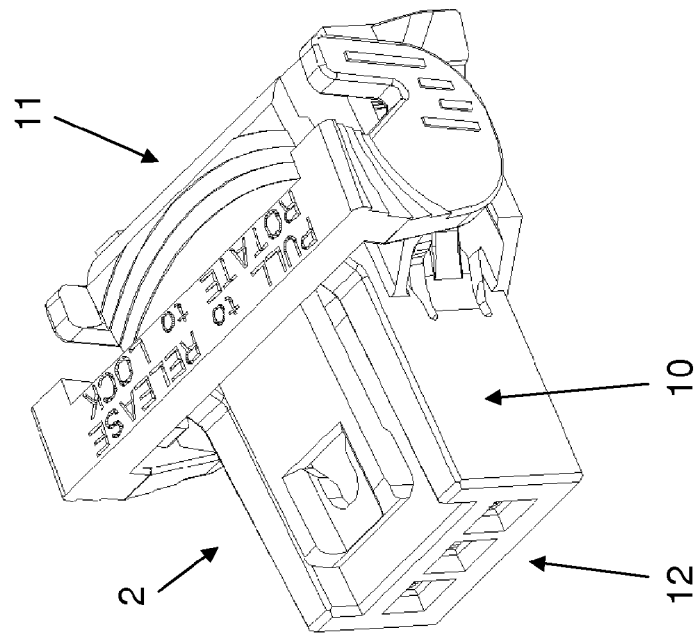
Figure 6C:
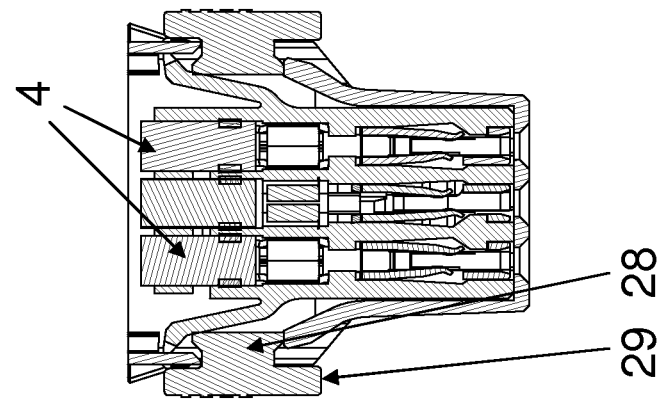
Figure 6B:
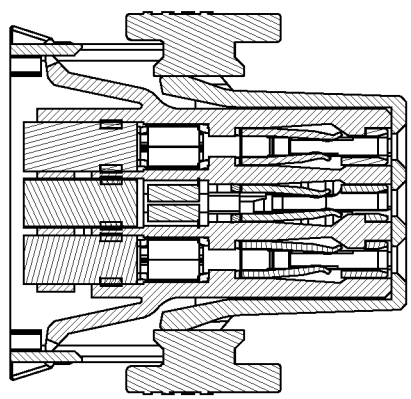
Figure 6A:
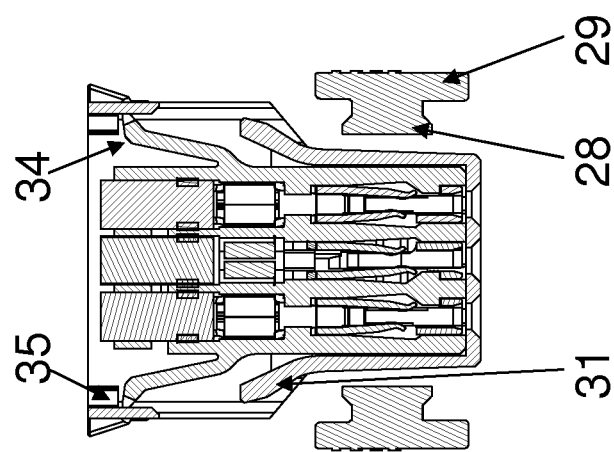
Figure 10D:
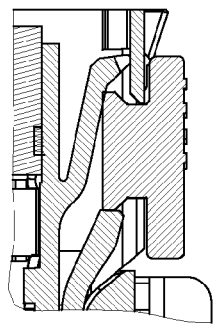
Figure 10C:
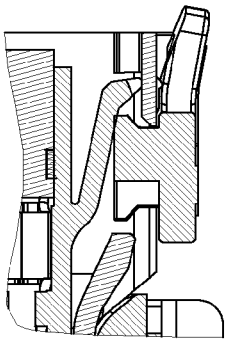
Figure 10B:
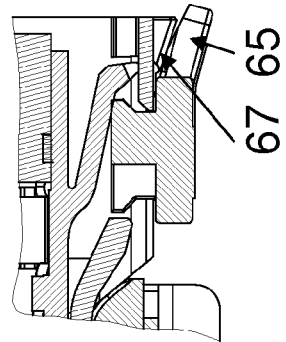
Figure 10A:
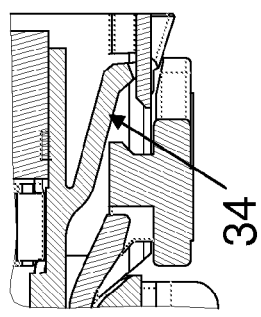
Figure 12:
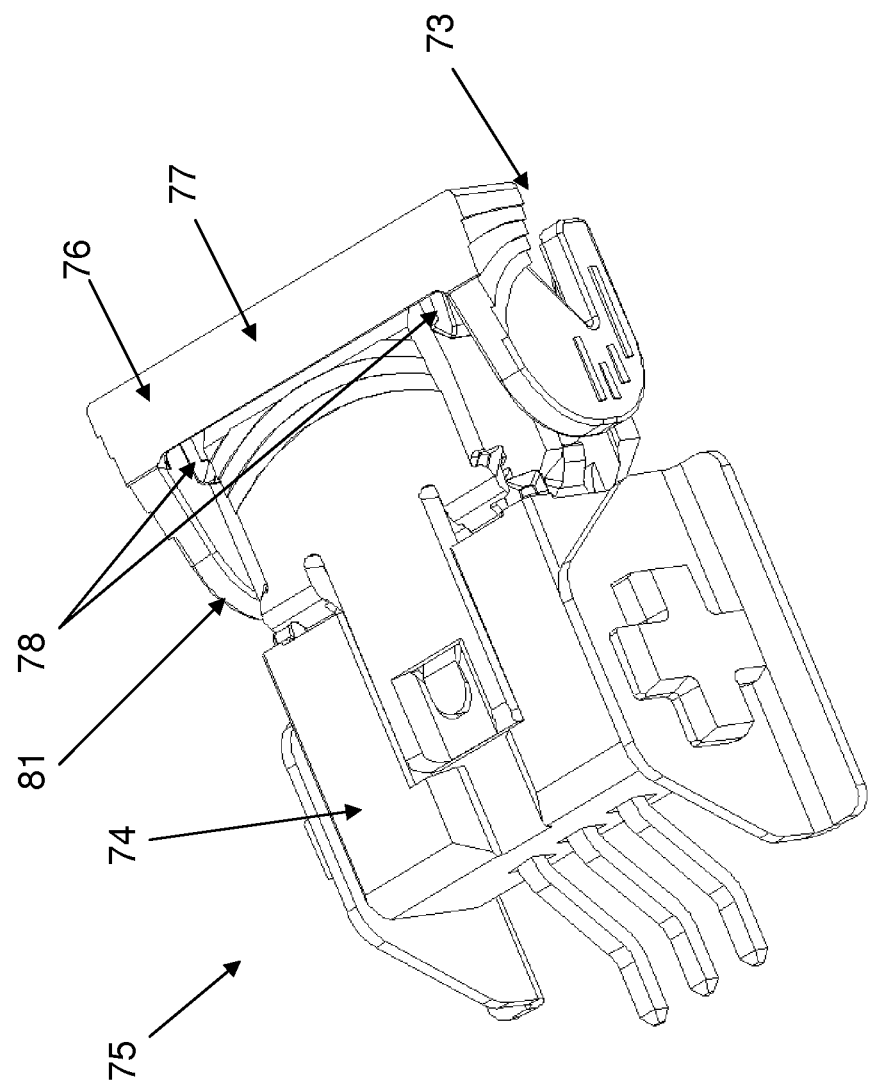
Figure 14B:
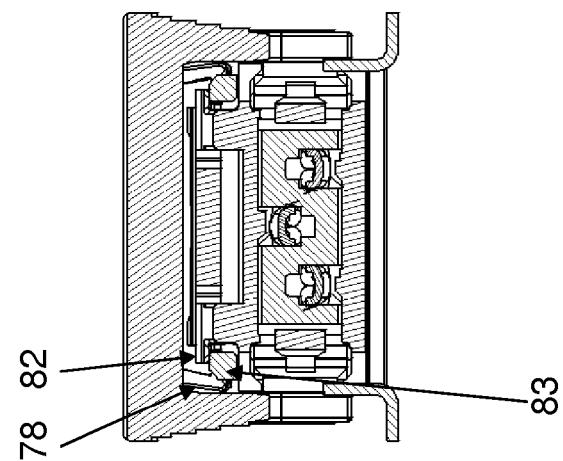
Figure 14A:
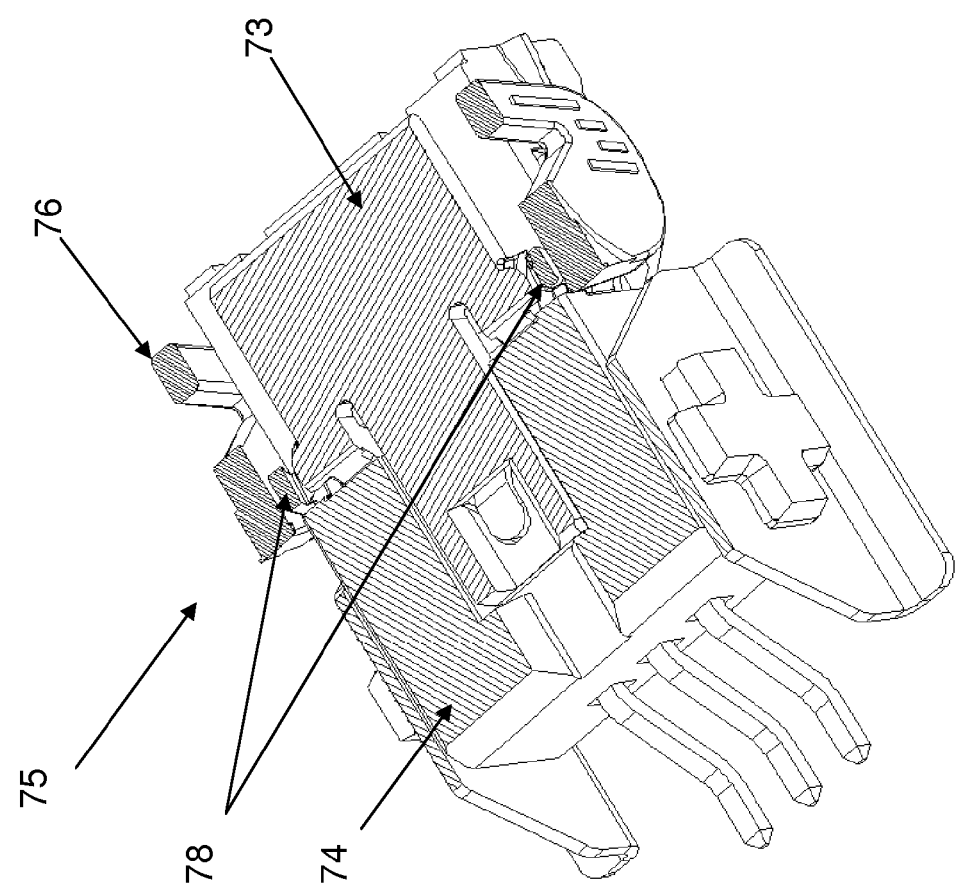
Figure 15:
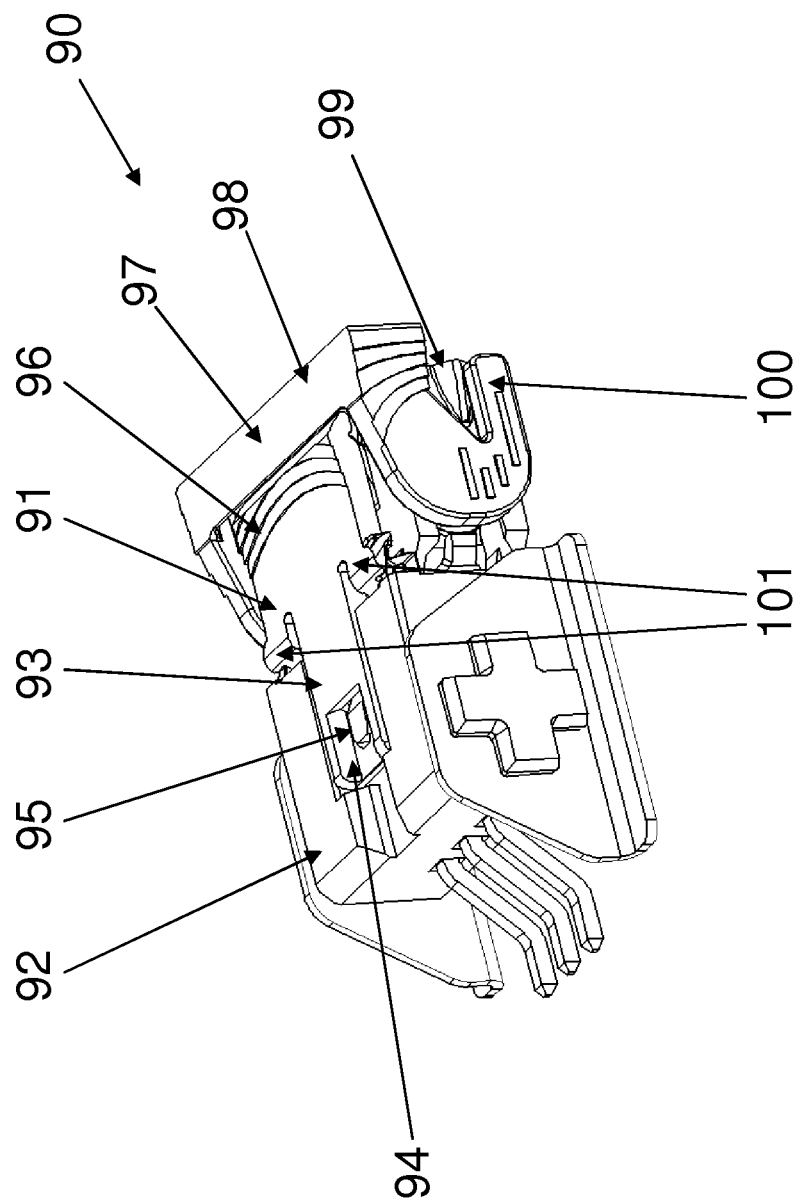

FIG. 1A-B: show perspective views of an exemplary embodiment of an assembly with a cable connector and a complementary pin header connector;

FIG. 2: shows a separate cable connector of the assembly of FIGS. 1A-B;

FIG. 3: shows a cross section of the connector of FIG. 2;

FIG. 4: shows in exploded view a clip with terminal contacts of the connector of FIG. 2;

FIG. 5A-C: show in perspective view three consecutive steps of assembling the connector of FIG. 2;

FIG. 6A-C: show the steps of FIG. 5A-C with the connector in cross section;

FIG. 7A-D: show in side view four consecutive steps of securing the latch of the connector of FIG. 2;

FIG. 8A-D: show the steps of FIGS. 7C and 7D in cross section;

FIG. 9A-D: show four consecutive steps of releasing the secured the latch of the connector of FIG. 2;

FIG. 10A-D: show the steps of FIGS. 9A-D in cross section;

FIGS. 11A and 11B: shows a cross section of the coupled connector with a handle bar;

FIG. 12: shows in perspective view an alternative embodiment of a connector assembly;

FIG. 13A-B: shows the assembly of FIG. 12 just before mating of the connectors is completed in perspective view and cross section, respectively;

FIG. 14A-B: shows the assembly of FIG. 12 after mating of the connectors is completed in perspective view and cross section, respectively;

FIG. 15: shows a further alternative embodiment of a connector assembly.

FIGS. 1A and 1B show different perspective views of an assembly 1 of a first connector 2 and a second connector 3. In this exemplary embodiment the first connector 2 is a cable connector for connecting cables 4 to the second connector 3, which is a board connector mounted by means of holders 5 onto a substrate (not shown), such as a printed circuit board (PCB). The board connector 3 comprises parallel contact pins 6 with one end 7 bent to contact the PCB, and opposite ends (not shown) extending into a receiving cavity of the board connector 3.

The cable connector 2, shown as a separate part in FIG. 2, comprises a housing 10 with a cable receiving side 11 and a contact side 12 opposite to the cable receiving side 11. FIG. 3 shows the connector 2 in a cross section along a plane through the cable ends 4. The housing 10 encases a clip 13 holding a row of terminal contacts 14 having a crimp connection 15 at one end and a contact pin receiving section 16 at their opposite end (see also FIG. 4). The crimp connections 15 connect the terminal contacts 14 to the respective cables 4. The terminal contacts 14 are inserted laterally into matching cavities in the clip 13 from alternate sides of the clip 13.

After insertion of the terminal contacts 14 into the respective cavities the clip 13 is inserted into the housing via a clip receiving opening 20 at the cable entry side 11 of the housing 10. After insertion of the clip 13 the contact pin receiving sections 16 of the terminal contacts 14 are aligned with respective contact pin receiving openings 21 in the housing 10 at the contact side 12 and the cables 4 extend from the cable receiving side 11 of the housing 10.

The housing 10 comprises a narrow rectangular section 23 around the pin receiving sections 16 of the terminal contacts 14, a wider rectangular section 24 encasing the cable ends 4 and a gradually narrowing intermediate section 25 at the crimp sections 15 of the terminal contacts. The side faces at the narrowing part are provided with openings 27 for receiving respective cylindrical protrusions 28 of a securing lock 29, as will be explained below. At their respective ends closest to the contact face 12 the openings 27 are provided with a resilient lip 31 pointing towards the cable receiving end 11. The resilient lip 31 has a narrowed tip 32 (see FIG. 5A).

The side faces of the clip 13 comprise resilient lips 34 (see FIG. 4) pointing towards the cable receiving end 11. Near the cable receiving opening 20 the housing 10 comprises inwardly projecting rims 35. When the clip 13 is inserted into the housing 10, the resilient lips 34 of the clip 13 flex inwardly and snap behind the rims 35 to lock the clip 13 into the housing 10.

The housing 10 comprises a top side with a latch 41 having a latching end 42 and a release end 43. The release end 43 has one side connected to the top side of the housing 10 by means of a resilient connecting part 44 forming a hinge section. The opposite end 45 of the release end 43 is a free end and can be flexed inwardly pivoting about a pivot section formed by the resilient connecting parts 44.

The latch end 42 extends from the release end 43 in the direction of the contact face 12. Near the release end 43 the latch end 42 is flanked by the two resilient connecting parts 44. The opposite end 46 of the latch end 42 is free and resiliently biased to a latching position. By pushing the release end 43 the latch 41 pivots about the pivot section 44 and the latching end 42 is moved upwardly away from the latching position. At its free end 46 the latch end 42 comprises a recess 48 with an opening 49. The top face of the housing 10 comprises a recess 51 extending from the contact face 12 to the cable receiving side 11 of the housing 10. This recess 51 has a width corresponding to the width of the latch end 42.

Returning to FIGS. 1A and 1B, the board connector 3 has a top face 54 with a latch receiving recess 55 receiving the latch end 42 of the latch 41. The latch receiving recess 55 comprises a bottom face with a cam 57 with a slanting front face 58. When the cable connector 2 is coupled to the board connector 3, the latch 41 of the cable connector 2 is received in the latch receiving recess 55. The tip of the latch end 42 slides over the slanting front face 58 of the cam 57 until the cam 57 snaps into the opening 49 in the latch end 42. To release the two connectors 2, 3 a user can push the release end 43 of the latch 41 to pivot the latch 41 moving the latch end 42 upwardly. The cable connector 2 can now be disconnected from the board connector 3. To prevent disconnection of the two connectors 2, 3 the cable connector 2 comprises the securing lock 29 blocking movement of the release end 43 of the latch 41.

The securing lock 29 comprises a handle bar 61 extending along an upper side of the clip receiving opening 20 when the securing lock 29 is in a securing position (FIGS. 1A, 1B and 6C). At both outer ends of the handle bar 61 the securing lock 29 comprises a lever or arm 62. One end of the levers 62 is connected to the handle bar 61 while the respective opposite ends comprise the rotational axis section formed by a cylindrical protrusion 28. In FIGS. 5B and 5C the securing lock 29 is shown with one of the levers 62 broken away to show the respective cylindrical protrusion 28. The protrusions 28 of the two levers 62 point towards each other and are aligned to define a rotational axis. The two cylindrical protrusions 28 are symmetrically provided with a rectangular recess 64 matching the narrow tip 32 of the resilient lips 31 at the side face of the housing 10.

In side view the securing lock 29 has a J-shaped outline with the lever 62 forming the long side of the J-shape, while a shorter flexible arm 65 forms the short side of the J-shape. The flexible arm 65 is substantially parallel to the lever 62. The recess 64 in the cylindrical protrusion 28 of the securing lock 29 is arranged at the bottom tip of the J-shape, symmetrically between the lever 62 and the flexible arm 65. The distance between the two oppositely arranged cylindrical protrusions 28 corresponds to the width of the narrower section 23 of the housing.

The securing lock 29 can be mounted onto the connector housing 10 by sliding the cylindrical protrusions 28 over the flexible arms 31 of the side faces of the housing 10 until the cylindrical protrusions 28 click behind the tips 32 of the flexible arms 31 into the openings 27 at the side faces of the housing 10, as shown in FIG. 5C. This causes an audible click informing the user that the securing lock 29 is in its right position and that the secure lock 29 should not be pushed further. The cylindrical protrusions 28 fit within the openings 27, such that they can rotate but not shift. In this position, the latch 41 can still pivot and the latch 41 is not yet secured into its latching position.

After coupling the cable connector 2 with the board connector 3 the narrowed tips 32 of the resilient arms 31 of the housing 10 protrude from the receiving opening of the board connector 3 (see FIG. 7A). FIGS. 7A-D shows the coupled connectors 2, 3 with the arms of the securing lock 29 being broken away to show the cylindrical protrusion 28 and the narrowed tip 32 of the flexible arm 31 of the housing 10. The housing of the board connector 3 prevents outward flexing of the flexible arms 31.

At its side faces the housing 10 of the cable connector 2 comprises a flat surface 66 near the release end 43 of the latch 41 next to a bulging surface 67 way from the release end 43 of the latch 41. From the opening 27 in the side face towards the cable receiving side 11 the bulging surface 67 slants outwardly with an angle α which gradually increases from $\alpha=0$ adjacent the flat surface 66 to $\alpha=\alpha_{MAX}$ at an opposite side of the bulge 67. In other words the bulge 67 slants in two orthogonal directions.

FIGS. 11A and 11B show a cross section of the coupled connector 2 with the handle bar 61. The handle bar 61 of the securing lock 29 is L-shaped in cross section and has a top ridge 68 and a lower flange 69 extending from the top ridge 68 in the direction of the contact face 12. The ridge 68 comprises a V-shaped notch 70 at the root of the lower flange 69.

Pushing or pulling the handle bar of the securing lock towards the cable receiving side (arrow A in FIG. 6B), rotates the securing lock 29 and brings the recess 64 in the cylindrical protrusion 28 in line with the narrow tip 32 of the flexible arm 31 of the housing 10 (FIGS. 7C and 8C). Meanwhile the flexible arm 65 of the securing lock 29 slides over the bulge 67 of the housing 10. As a result the flexible arm 65 is gradually flexed. The spring loaded flexible arm 65 pushes the cylindrical protrusion 28 against the flexible arm 31 of the housing 10. As soon as the recess 64 in the cylindrical protrusion 28 is in line with the narrowed tip 32, the cylindrical protrusion 28 snaps over the narrowed tip 32 and the securing lock 29 slides in the direction of the board connector 3 until the narrowed tip 32 is within the recess 64 of the cylindrical protrusion 28 (FIGS. 7D and 8D). As shown in FIGS. 8A-D, also the resilient lips 34 of the clip 13 push the cylindrical projections 28 moving them to snap over the narrowed tip 32.

When the cylindrical projections 28 slide over the tip 32, the lower flange 69 of the handle bar 61 slides below the release end 43 of the latch 41, as shown in FIGS. 11A and 11B. When the narrowed tip 32 is slid into the recess 64 in the cylindrical projection 28, the tip of the release end 43 of the latch 41 slides into the V-shaped notch 70 in the handle bar 61. In this position of the securing lock 29 the release end 43 of the latch 41 is immobilized and cannot be pushed inwardly anymore. As a result, the latch 41 cannot be pivoted anymore and is secured in its latching position.

Figure 9D:
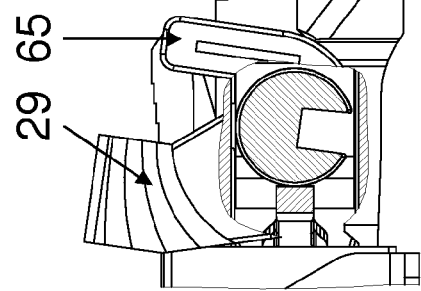
Figure 9C:
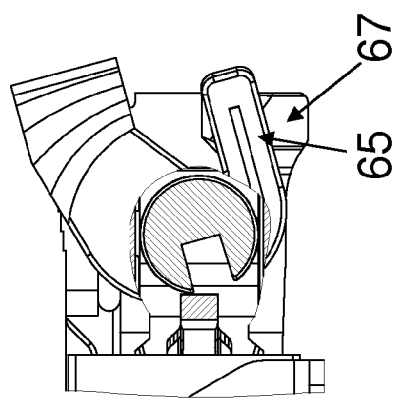
Figure 9B:
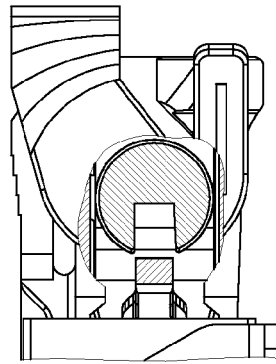
Figure 9A:
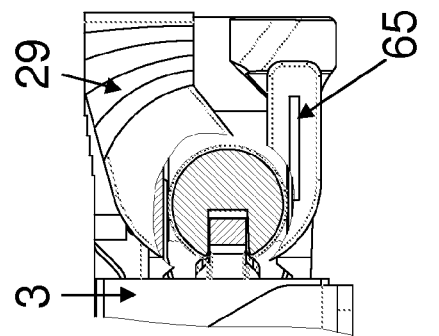

The securing lock 29 can be released by pulling it in a direction indicated by arrow A in FIG. 9A away from the board connector 3 until the narrowed tip 32 is out of the recess 64 in the cylindrical protrusion 28 and the lower flange 69 is removed from below the tip of the release end 43 of the latch 41 against the action of the spring loaded flexible arms 65. The securing lock 29 can be rotated to an upward position, as shown in consecutive steps in FIGS. 9B-D. During upward rotation, indicated by arrow B, of the lock 29 the flexible arms 65 of the securing lock 29 are gradually relaxed. In this position of the securing lock 29 the latch 41 can be pivoted again to release the latch 41 allowing disengagement of the two connectors 2, 3.

FIG. 12 shows an alternative embodiment of a connector assembly. The connector assembly 75 is similar to the embodiment shown in FIG. 1, and comprises a cable connector 73 connected to a board connector 74. The cable connector 73 comprises a securing lock 76 having a handle bar 77 with a lower side provided with two hooks 78 with cams 79 pointing to each other. The two hooks 78 are arranged at short distance from the side arms or levers 81 of the handle bar 77.

FIGS. 13A and B show the connector assembly 75 half-way mating. The cable connector 73 is not yet fully inserted into the board connector 74. The securing lock 76 is in an upright position. In the drawing of FIGS. 13 and 14 the handle bar 77 of the securing lock 76 is not shown in order to provide a view on the position of the hooks 78 of the securing lock 76. The hooks 78 hook behind respective stops 82 protruding sidewardly from the housing of the cable connector 73. The stops 82 lock the hooks 78 of the securing lock 76 and prevent that the securing lock 76 can be rotated into its securing position.

The board connector 74 has a mating face with projections 83 arranged in line with the hooks 78 of the securing lock 76. The projections are provided with slanting top ends 84. When the cable connector 73 is pushed further into the board connector 74 (see FIGS. 14A and B), the protrusions 83 engage the hooks 78 and the slanting top ends 84 of the protrusions 83 gradually push aside the hooks 78. The hooks 78, the protrusions 83 and the stops 82 are configured such that the hooks 78 are sufficiently pushed aside to be unhooked from the stops 82 of the cable connector 73 when the cable connector 73 and the board connector 74 are fully mated. Subsequently, the securing lock 76 can be rotated into its securing position. This configuration prevents that the securing lock 76 is rotated unintentionally in an early stage before the two connectors 73, 74 are fully mated.

A further alternative embodiment is shown in FIG. 15. This connector assembly 90 comprises a cable connector 91 and a board connector 92. The cable connector 91 is provided with a latch 93 pivotable about a pivot section 101. The latch 93 has a latch end 94 forming a snap joint with a latch protrusion 95 on the top side of the board connector 92. At the opposite side of the pivot section 101 the latch 93 comprises a release end 96 enabling a user to release the latch by pushing down the release end 96. A securing lock 97 is attached to the cable connector 91 and is rotatable between a release position and a securing position without any sliding movement. The securing lock 97 has a handle bar 98, which is not provided with a lower flange 69 sliding below the release end of the latch, as with the embodiment of FIGS. 1-11. The securing lock 97 has cylindrical protrusions (not shown) corresponding to the cylindrical protrusions 28 of the embodiment shown in FIGS. 1-11, but without a recess 64 for guiding a sliding movement. Instead of the bulging surface 67 of the embodiment shown in FIGS. 1-11, which slants down in two directions, the cable connector of FIG. 15 comprises a rib or ledge 99 engaging a inner surface of the flexible arms 100 of the securing lock 97 to provide a snap mechanism holding the securing lock 97 in its securing position, as shown in FIG. 15.

In the securing position of the securing lock 97 the handle bar 98 covers the release end 96 of the latch 93. This way, the release end 96 of the latch 93 is not accessible for being pushed down to release the latch 93. Accordingly unintentional unlatching of the latch 93 is prevented merely by covering the release end 96 of the latch 93 instead of immobilizing it.

The invention claimed is:

1. A connector assembly comprising a first connector, a second connector and a latch biased in a first direction to connect the first and second connectors and movable in a second direction by a user to disconnect the first and second connectors, the assembly comprising a securing lock which is:
   rotatable between a release position and an intermediate position, and,
   when in the intermediate position, slidable to a securing position to secure the latch in a latching position by blocking movement of a release end of the latch,
   wherein the assembly comprises a resilient element configured to force the securing lock to slide into the securing position.

2. A connector assembly according to claim 1 wherein the assembly comprising a sliding guide and the resilient element is configured to force the securing lock to slide via the sliding guide into the securing position.

3. A connector assembly comprising a first connector, a second connector and a latch biased in a first direction to connect the first and second connectors and movable in a second direction by a user to disconnect the first and second connectors, the assembly comprising a securing lock which is:
   rotatable between a release position and an intermediate position, and, whenin the intermediate position, slidable to a securing position to secure the latch in a latching position by blocking movement of a release end of the latch, wherein the securing lock comprises one or more cylindrical parts defining a rotational axis, and wherein the assembly comprises a sliding guide comprising a recess in the cylindrical part and a protrusion slideable within the recess when the securing lock is between the intermediate position and the securing position.

4. A connector according to claim 2, wherein the resilient element comprises at least one flexible arm of the securing lock, wherein the flexible arm engages a slanting surface to build up a spring force during movement of the securing lock into its intermediate position.

5. A connector assembly according to claim 1, wherein the latch is pivotable about a pivot section, the latch having a latch end at one side of the pivot section and a release end at the opposite side of the pivot section, wherein the securing lock engages the release end when the securing lock is in its securing position to prevent pivoting of the latch when the latch is in its latching position.

6. A connector assembly according to claim 5, wherein the securing lock comprises an edge sliding underneath a lower surface of the release end of the latch when the securing lock slides into its securing position.

7. A connector assembly according to claim 1, wherein the latch is pivotable about a pivot section, the latch having a latch end at one side of the pivot section and a release end at the opposite side of the pivot section, wherein the securing lock is provided with a flange covering the release end when the securing lock is in its securing position to prevent pivoting of the latch when the latch is in its latching position.

8. A connector assembly according to claim 1, wherein the latch is part of the first connector.

9. A connector assembly according to claim 8, wherein the securing lock is mounted on the first connector.

10. A connector assembly according to claim 1 provided with one or more stops blocking the securing lock in its release position, and one or more release elements to release the securing lock when the connectors are fully mated to enable rotation of the securing lock into its securing position.

11. A connector assembly according to claim 10, wherein the stops include one or more hooks of the securing lock, the securing lock being attached to one of the connectors of the assembly, said connector being provided with cams engaging the hooks to keep the securing lock into its release position.

12. A connector assembly according to claim 11, wherein the other connector of the assembly comprises one or more protrusions, each protrusion being configured to force a hook and a respective cam apart to unhook the hook from the cam, when mating of the two connectors is completed.

13. A connector assembly according to claim 12, wherein contact faces of the hooks and the cams make an angle with a pulling direction, the contact faces being chamfered to decrease said angle during unhooking by the protrusions.

14. A connector assembly according to claim 11, wherein the hooks are an integral part of arms of securing lock.

15. A connector assembly according to claim 1, wherein the securing lock and one of the connectors are provided with mutually engaging snap sections locking the securing lock in its securing position.

16. A connector assembly according to claim 1 wherein the securing lock comprise two arms and a handle bar bridging outer ends of the two arms, while opposite outer ends of the arms rotationally engage side faces of one of the connectors of the assembly.

17. A connector assembly according to claim 1, wherein the first connector is a cable connector and the second connector is a board connector.

18. A connector for an assembly according to claim 1.

19. A housing for a connector according to claim 18.

20. A connector assembly comprising a first connector, a second connector and a latch for connecting the first and second connectors, the assembly comprising a securing lock which is rotatable between a release position and an intermediate position and slidable from the intermediate position into a securing position securing the latch in a latching position;
   wherein the latch is pivotable about a pivot section, the latch having a latch end at one side of the pivot section and a release end at the opposite side of the pivot section, wherein the release end comprises a flange and the securing lock engages the release end when the securing lock is in its securing position to prevent pivoting of the latch when the latch is in its latching position; and
   wherein the securing lock comprises an edge positioned such that the flange slides underneath a lower surface of the edge when the securing lock slides into its securing position.

* * * * *

UNITED STATES PATENT AND TRADEMARK OFFICE
CERTIFICATE OF CORRECTION

PATENT NO. : 9,755,358 B2
APPLICATION NO. : 14/895945
DATED : September 5, 2017
INVENTOR(S) : Gert Julien Droesbeke et al.

It is certified that error appears in the above-identified patent and that said Letters Patent is hereby corrected as shown below:

In the Claims

Claim 3, Column 7 Line 27:
position, and, whenin the intermediate position, slid-
Should read:
position, and, when in the intermediate position, slid- Signed and Sealed this
Nineteenth Day of December, 2017

Joseph Matal
*Performing the Functions and Duties of the
Under Secretary of Commerce for Intellectual Property and
Director of the United States Patent and Trademark Office*